US010823127B2

(12) United States Patent
Zhang

(10) Patent No.: US 10,823,127 B2
(45) Date of Patent: Nov. 3, 2020

(54) METHODS AND SYSTEMS FOR A FUEL INJECTOR

(71) Applicant: Ford Global Technologies, LLC, Dearborn, MI (US)

(72) Inventor: Xiaogang Zhang, Novi, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 140 days.

(21) Appl. No.: 15/921,335

(22) Filed: Mar. 14, 2018

(65) Prior Publication Data
US 2019/0285037 A1   Sep. 19, 2019

(51) Int. Cl.
*F02M 61/18* (2006.01)
*F02M 63/00* (2006.01)
*F02B 17/00* (2006.01)
*F02B 3/02* (2006.01)
*F02M 61/20* (2006.01)

(52) U.S. Cl.
CPC ........... *F02M 61/1893* (2013.01); *F02B 3/02* (2013.01); *F02B 17/005* (2013.01); *F02M 61/184* (2013.01); *F02M 61/1833* (2013.01); *F02M 61/20* (2013.01); *F02M 63/0078* (2013.01)

(58) Field of Classification Search
CPC ............ F02M 61/1893; F02M 61/162; F02M 61/163; F02M 61/1806; F02M 61/1813; F02M 61/182; F02M 61/1826; F02M 61/1833; F02M 61/184; F02M 61/1846; F02M 61/20; F02M 61/0078; F02B 3/02; F02B 17/005
See application file for complete search history.

(56) References Cited

U.S. PATENT DOCUMENTS

| | | | | |
|---|---|---|---|---|
| 3,058,453 A | * | 10/1962 | May | F02B 19/06 123/297 |
| 4,347,822 A | | 9/1982 | Casey | |
| 4,674,460 A | * | 6/1987 | Asmus | F02M 69/08 123/445 |
| 5,707,012 A | | 1/1998 | Maier et al. | |
| 5,735,240 A | * | 4/1998 | Ito | F02B 17/005 123/295 |
| 6,045,063 A | * | 4/2000 | Koike | F02M 61/182 239/533.12 |
| 7,712,684 B2 | * | 5/2010 | Masuda | F02M 61/08 239/453 |
| 9,840,994 B2 | | 12/2017 | Zhang | |
| 9,845,780 B2 | | 12/2017 | Zhang | |
| 10,458,380 B2 | * | 10/2019 | Zhang | F02M 61/1833 |

(Continued)

OTHER PUBLICATIONS

Kurtz, E. et al., "Methods and Systems for a Fuel Injector," U.S. Appl. No. 15/461,238, filed Mar. 16, 2017, 61 pages.

*Primary Examiner* — Hai H Huynh
*Assistant Examiner* — Gonzalo Laguarda
(74) *Attorney, Agent, or Firm* — Geoffrey Brumbaugh; McCoy Russell LLP

(57) ABSTRACT

Methods and systems are provided for a fuel injector. In one example, a system may include a fuel injector having a half-annular venturi shaped outlet passage arranged between an outlet surface of the fuel injector and a half-cone shaped end portion of a nozzle. The nozzle may further comprise one or more air entraining features working in tandem with the half-annular venturi outlet passage to promote air-fuel mixing.

20 Claims, 3 Drawing Sheets

(56) References Cited

U.S. PATENT DOCUMENTS

| | | | |
|---|---|---|---|
| 10,480,473 B2* | 11/2019 | Zhang | F02M 61/1833 |
| 2017/0284354 A1* | 10/2017 | Powell | F02M 61/184 |
| 2018/0142657 A1* | 5/2018 | Kobayashi | F02M 61/1806 |
| 2019/0003371 A1* | 1/2019 | Polonowski | F02B 19/18 |
| 2019/0285037 A1* | 9/2019 | Zhang | F02B 17/005 |

* cited by examiner

METHODS AND SYSTEMS FOR A FUEL INJECTOR

FIELD

The present description relates generally to a fuel injector comprising air entraining features.

BACKGROUND/SUMMARY

In diesel and gasoline engines, air is drawn into a combustion chamber during an intake stroke by opening one or more intake valves. Then, during the subsequent compression stroke, the intake valves may be closed, and a reciprocating piston of the combustion chamber compresses the gases admitted during the intake stroke, increasing the temperature of the gases in the combustion chamber. Fuel is then injected into the hot, compressed gas mixture in the combustion chamber, following which fuel is combusted, through one or more or combinations of compression ignition and spark ignition, etc. The combusting air-fuel mixture pushes on the piston, driving motion of the piston, which is then converted into rotational energy of a crankshaft.

Diesel and/or gasoline fuels may not mix evenly with the air in the combustion chamber, which may lead to the formation of dense fuel pockets. These dense regions of fuel may produce soot. Particulate filters may be arranged in an exhaust passage to decrease an amount of soot and other particulate matter. However, particulate filters may lead to increased manufacturing costs and may not solve fuel economy issues associated with unburned fuel.

Technologies for combating engine soot output may include features for entraining air with the fuel prior to injection. One or more passages may be arranged in the injector body, either as an insert in the engine head deck surface or in the engine head. Air from the combustion chamber may mix with the fuel, thereby cooling the injection temperature while simultaneously entraining air with fuel. A lift-off length may be lengthened and start of combustion may be retarded, thereby limiting soot production through a range of engine operating conditions, reducing the need for a particulate filter.

However, the inventors herein have recognized potential issues with such injectors. As one example, the previously described fuel injectors may no longer sufficiently reduce soot production to a desired level in light of increasingly stringent emissions standards. As such, particulate filters may be located in an exhaust passage, thereby increasing a manufacturing cost and packaging restraint of the vehicle.

In one example, the issues described above may be addressed by a fuel injector comprising a nozzle comprising a half-cylindrical stem and a half-conical end portion, and where an outlet passage comprises a half-annular venturi shape configured to flow fuel when the nozzle is actuated toward a combustion chamber. In this way, the outlet passage may limit a range in which the fuel injector injects fuel, thereby decreasing fuel penetration to undesired portions of the combustion chamber.

As one example, the fuel injector may be a side-mount injector, positioned to inject in the combustion chamber. In some examples, the fuel injector may be positioned perpendicularly to an axis of oscillation of a piston. The half-annular venturi shaped outlet passage may be configured to inject fuel in a direction angled to a central axis of the fuel injector, wherein the fuel injection is directed toward a spark plug arranged opposite the piston. By doing this, a likelihood of fuel impinging onto a top surface of the piston may be reduced, which may decrease soot production.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 2A-3B are shown approximately to scale.

DETAILED DESCRIPTION

The following description relates to systems and methods for a fuel injector. The fuel injector may comprise a variety of air entraining features configured to mix air with fuel prior to combustion. The fuel injector inject fuel into a cylinder of a combustion engine, such as the combustion engine depicted in FIG. 1. The fuel injector may be a direct injector.

Figure 2B:
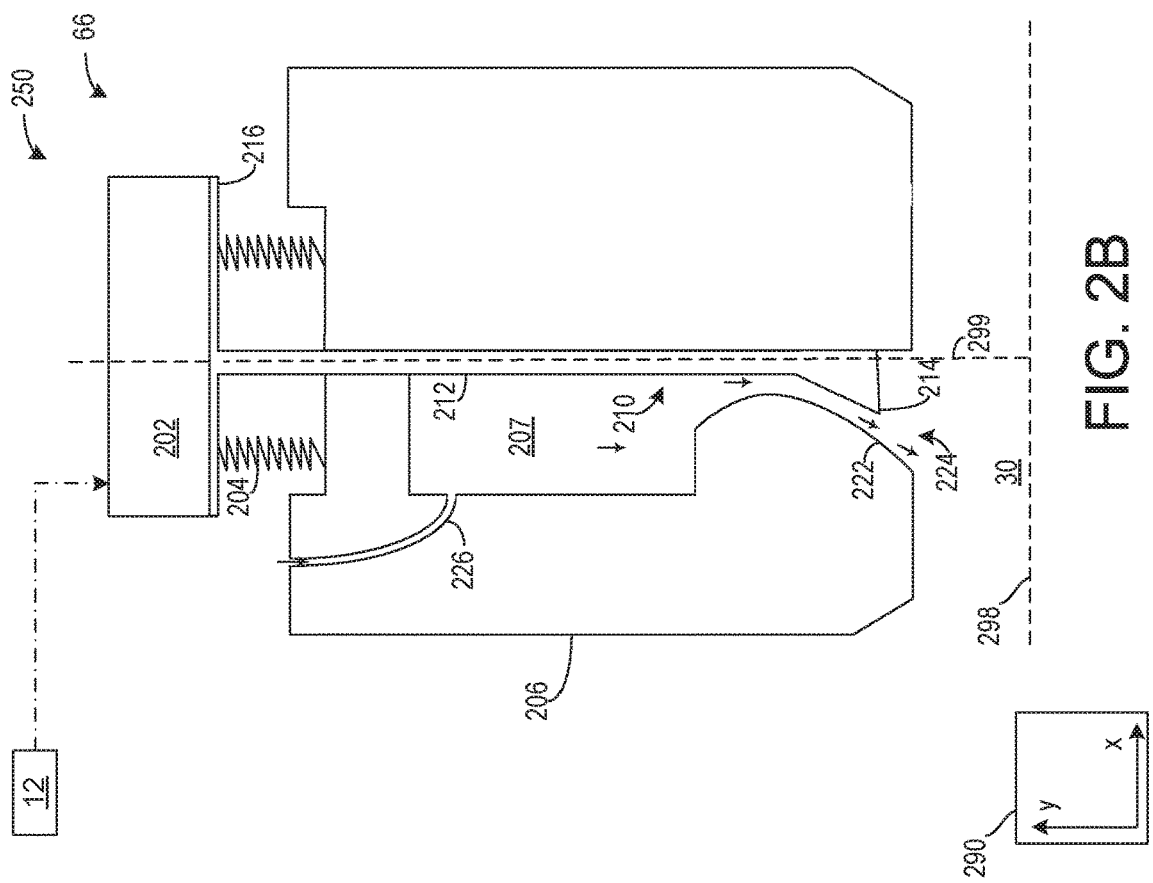
FIGS. 2A and 2B show first and second positions of the fuel injector.
Figure 2A:
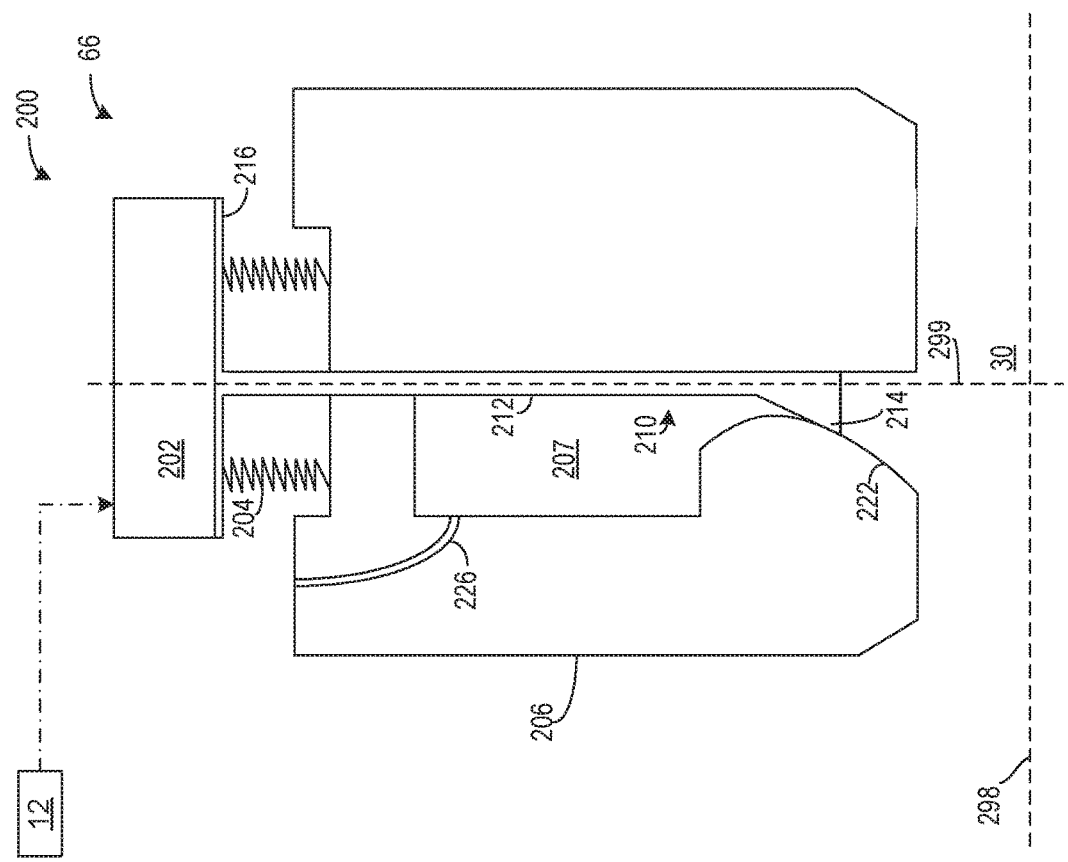

An embodiment of the fuel injector is shown in FIGS. 2A and 2B. Therein, the fuel injector comprises a nozzle comprising a substantially half-cone shaped end portion extending from a half-cylinder shaped stem. Actuation of the nozzle may adjust an opening of a half-annular venturi shaped outlet passage formed between the end portion and an outlet surface of the fuel injector.

Figure 3B:
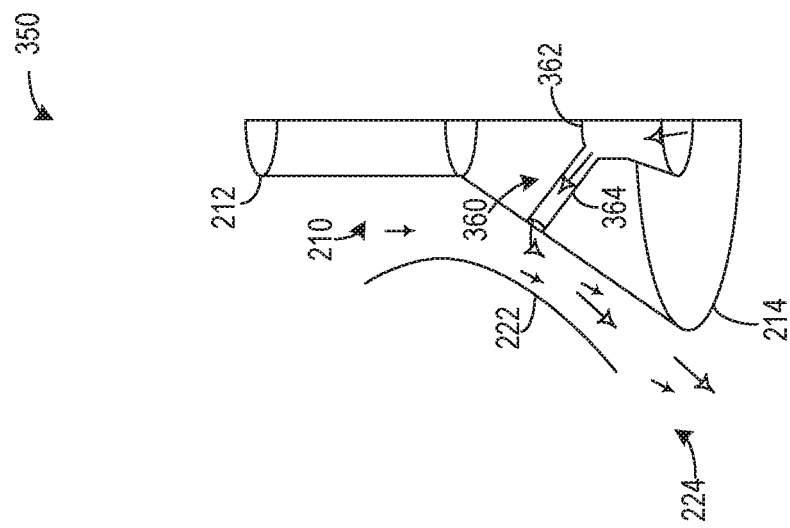
FIGS. 3A and 3B show various embodiments of the fuel injector comprising one or more air entraining features.
Figure 3A:
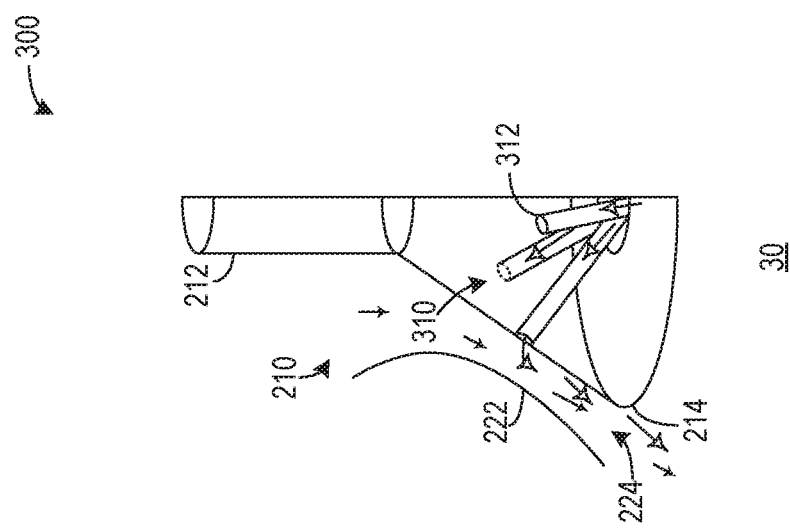

FIG. 3A shows a first embodiment of air entraining features which may be arranged in the nozzle of the fuel injector. The first embodiment may include a plurality of passages extending from a base of the end portion to an angled surface of the end portion. The passages may direct combustion chamber gases to a venturi throat portion of the outlet passage such that fuel may mix with combustion chamber gases before flowing into the combustion chamber.

FIG. 3B shows a second embodiment of air entraining features which may be arranged in the nozzle of the fuel injector. The second embodiment may include a bell-shaped chamber configured to receive combustion chamber gases from the combustion chamber. The bell-shaped chamber may expel the combustion chamber gases to the venturi throat of the outlet passage via a cylindrical passage.

FIGS. 1-3B show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

Note that FIGS. 2B, 3A, and 3C show arrows indicating where there is space for gas and/or fluids to flow, and the solid lines of the device walls show where flow is blocked and communication is not possible due to the lack of fluidic communication created by the device walls spanning from one point to another. The walls create separation between regions, except for openings in the wall which allow for the described fluid communication.

Air in the combustion chambers may pass through the air passages and a more thorough and even mixing of the fuel and air may be achieved prior to combustion. In particular, the lift-off length, a term commonly used by those skilled in the art to describe the distance between the fuel spray and the combustion flame, may be increased. As such, more air may be entrained by the fuel prior to combustion. Thus, combustion may be delayed and air entrainment of the fuel may be increased, leading to a more complete and soot-free combustion.

Figure 1:
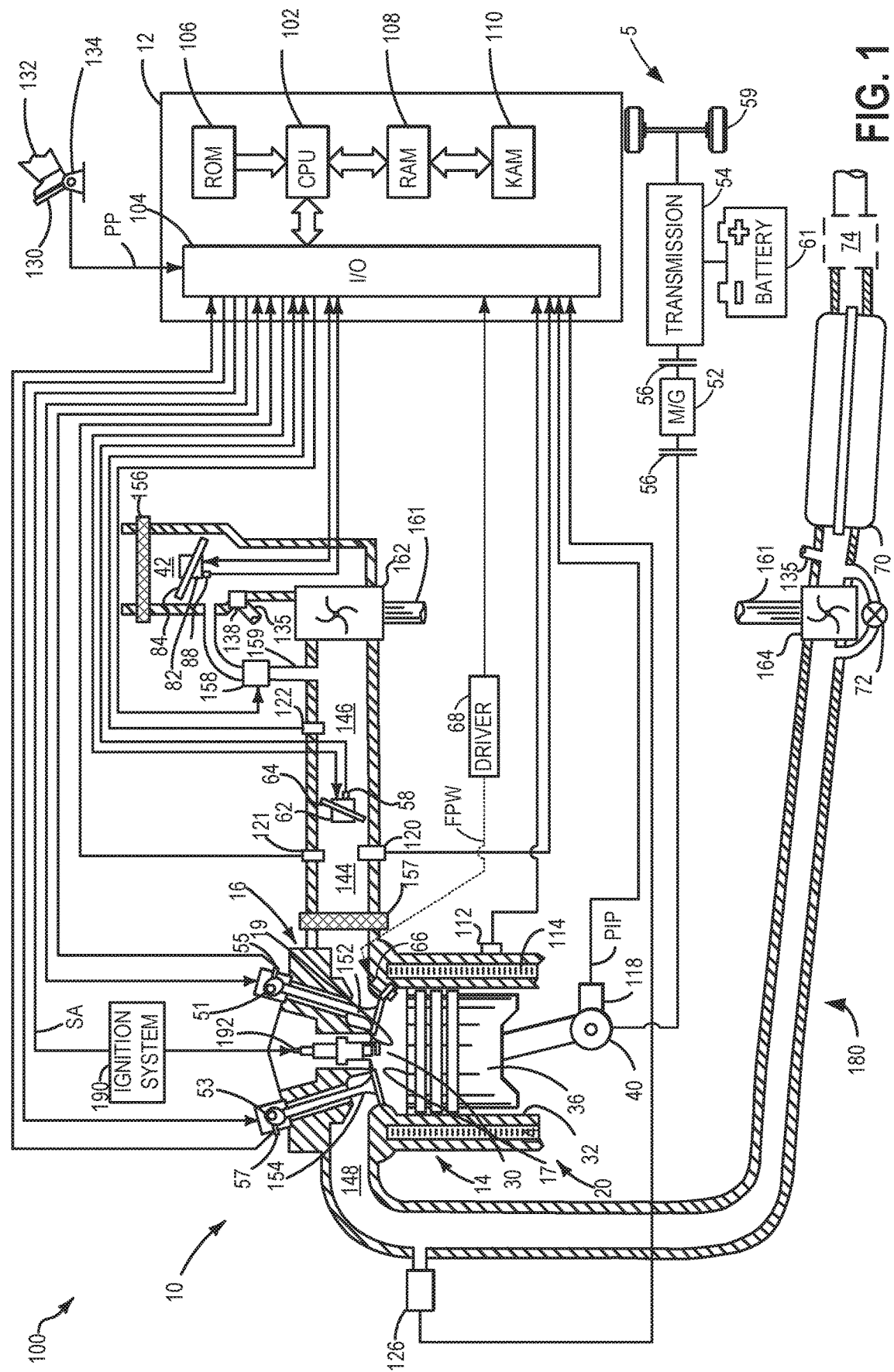
FIG. 1 shows an engine of a hybrid vehicle.

FIG. 1 depicts an engine system 100 for a vehicle. The vehicle may be an on-road vehicle having drive wheels which contact a road surface. Engine system 100 includes engine 10 which comprises a plurality of cylinders. FIG. 1 describes one such cylinder or combustion chamber in detail. The various components of engine 10 may be controlled by electronic engine controller 12.

Engine 10 includes a cylinder block 14 including at least one cylinder bore 20, and a cylinder head 16 including intake valves 152 and exhaust valves 154. In other examples, the cylinder head 16 may include one or more intake ports and/or exhaust ports in examples where the engine 10 is configured as a two-stroke engine. The cylinder block 14 includes cylinder walls 32 with piston 36 positioned therein and connected to crankshaft 40. The cylinder bore 20 may be defined as the volume enclosed by the cylinder walls 32. The cylinder head 16 may be coupled to the cylinder block 14, to enclose the cylinder bore 20. Thus, when coupled together, the cylinder head 16 and cylinder block 14 may form one or more combustion chambers. In particular, combustion chamber 30 may be the volume included between a top surface 17 of the piston 36 and a fire deck 19 of the cylinder head 16. As such, the combustion chamber 30 volume is adjusted based on an oscillation of the piston 36. Combustion chamber 30 may also be referred to herein as cylinder 30. The combustion chamber 30 is shown communicating with intake manifold 144 and exhaust manifold 148 via respective intake valves 152 and exhaust valves 154. Each intake and exhaust valve may be operated by an intake cam 51 and an exhaust cam 53. Alternatively, one or more of the intake and exhaust valves may be operated by an electromechanically controlled valve coil and armature assembly. The position of intake cam 51 may be determined by intake cam sensor 55. The position of exhaust cam 53 may be determined by exhaust cam sensor 57. Thus, when the valves 152 and 154 are closed, the combustion chamber 30 and cylinder bore 20 may be fluidly sealed, such that gases may not enter or leave the combustion chamber 30.

Combustion chamber 30 may be formed by the cylinder walls 32 of cylinder block 14, piston 36, and cylinder head 16. Cylinder block 14 may include the cylinder walls 32, piston 36, crankshaft 40, etc. Cylinder head 16 may include one or more fuel injectors such as fuel injector 66, one or more intake valves 152, and one or more exhaust valves such as exhaust valves 154. The cylinder head 16 may be coupled to the cylinder block 14 via fasteners, such as bolts and/or screws. In particular, when coupled, the cylinder block 14 and cylinder head 16 may be in sealing contact with one another via a gasket, and as such may the cylinder block 14 and cylinder head 16 may seal the combustion chamber 30, such that gases may only flow into and/or out of the combustion chamber 30 via intake manifold 144 when intake valves 152 are opened, and/or via exhaust manifold 148 when exhaust valves 154 are opened. In some examples, only one intake valve and one exhaust valve may be included for each combustion chamber 30. However, in other examples, more than one intake valve and/or more than one exhaust valve may be included in each combustion chamber 30 of engine 10.

The cylinder walls 32, piston 36, and cylinder head 16 may thus form the combustion chamber 30, where a top surface 17 of the piston 36 serves as the bottom wall of the combustion chamber 30 while an opposed surface or fire deck 19 of the cylinder head 16 forms the top wall of the combustion chamber 30. Thus, the combustion chamber 30 may be the volume included within the top surface 17 of the piston 36, cylinder walls 32, and fire deck 19 of the cylinder head 16.

In some examples, each cylinder of engine 10 may include a spark plug 192 for initiating combustion. Ignition system 190 can provide an ignition spark to cylinder 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

Fuel injector 66 may be positioned to inject fuel directly into combustion chamber 30, which is known to those skilled in the art as direct injection. Fuel injector 66 delivers liquid fuel in proportion to the pulse width of signal FPW from controller 12. Fuel is delivered to fuel injector 66 by a fuel system (not shown) including a fuel tank, fuel pump, and fuel rail. Fuel injector 66 is supplied operating current from driver 68 which responds to controller 12. In some examples, the engine 10 may be a gasoline engine, and the fuel tank may include gasoline, which may be injected by injector 66 into the combustion chamber 30. However, in other examples, the engine 10 may be a diesel engine, and the fuel tank may include diesel fuel, which may be injected by injector 66 into the combustion chamber. Further, in such examples where the engine 10 is configured as a diesel engine, the engine 10 may include a glow plug to initiate combustion in the combustion chamber 30.

In the embodiment of FIG. 1, the injector 66 is illustrated as a side-mount injector, wherein the injector 66 is mounted on a side-wall of the cylinder 14. The injector 66 may be positioned to inject in a direction angled to an axis of oscillation of the piston 36. In some examples, the injector 66 may comprise one or more features such that the injector may inject only toward the spark plug 192 and away from the top surface 17 of the piston 36.

In some examples, the injector 66 may comprise one or more features to reduce the temperature of air that is entrained by the fuel injected from the injector 66. Specifically, when fuel exits the injector 66 during fuel injection, it may travel a distance while mixing with air in a nozzle before combusting. In the description herein, the distance the fuel spray travels before combusting may be referred to as the "lift-off length." In particular, the lift-off length may refer to the distance the injected fuel travels before the combustion process begins. Thus, the lift-off length may be a distance between an orifice of the injector 66 from which the fuel exits the injector 66, to a point in the combustion chamber 30 at which combustion of the fuel occurs.

The injector 66 may decrease the temperature of the gases that mix with the fuel prior to combustion in the combustion chamber 30. Furthermore, the injector 66 may enable a higher spray velocity, within and at a nozzle of the injector 66, thereby increasing air entrainment with the fuel injection and fuel penetration into the combustion chamber 30. In this way, the lift-off length of the fuel spray may be increased and/or an amount of air entrainment in the fuel spray may be increased. The nozzle may be in fluidic communication with combustion chamber 30, such that gases in the combustion chamber 30 may enter the one or more flow-through passages of the nozzle and be recirculated back into the combustion chamber 30. As one example, intake air introduced into the combustion chamber 30 during an intake stroke, may be pushed into the nozzle during all or a portion of the compression stroke.

Intake manifold 144 is shown communicating with optional electronic throttle 62 which adjusts a position of throttle plate 64 to control airflow to engine cylinder 30. This may include controlling airflow of boosted air from intake boost chamber 146. In some embodiments, throttle 62 may be omitted and airflow to the engine may be controlled via a single air intake system throttle (AIS throttle) 82 coupled to air intake passage 42 and located upstream of the intake boost chamber 146. In yet further examples, throttle 82 may be omitted and airflow to the engine may be controlled with the throttle 62.

In some embodiments, engine 10 is configured to provide exhaust gas recirculation, or EGR. When included, EGR may be provided as high-pressure EGR and/or low-pressure EGR. In examples where the engine 10 includes low-pressure EGR, the low-pressure EGR may be provided via EGR passage 135 and EGR valve 138 to the engine air intake system at a position downstream of air intake system (AIS) throttle 82 and upstream of compressor 162 from a location in the exhaust system downstream of turbine 164. EGR may be drawn from the exhaust system to the intake air system when there is a pressure differential to drive the flow. A pressure differential can be created by partially closing AIS throttle 82. Throttle plate 84 controls pressure at the inlet to compressor 162. The AIS may be electrically controlled and its position may be adjusted based on optional position sensor 88.

Ambient air is drawn into combustion chamber 30 via intake passage 42, which includes air filter 156. Thus, air first enters the intake passage 42 through air filter 156. Compressor 162 then draws air from air intake passage 42 to supply boost chamber 146 with compressed air via a compressor outlet tube (not shown in FIG. 1). In some examples, air intake passage 42 may include an air box (not shown) with a filter. In one example, compressor 162 may be a turbocharger, where power to the compressor 162 is drawn from the flow of exhaust gases through turbine 164. Specifically, exhaust gases may spin turbine 164 which is coupled to compressor 162 via shaft 161. A wastegate 72 allows exhaust gases to bypass turbine 164 so that boost pressure can be controlled under varying operating conditions. Wastegate 72 may be closed (or an opening of the wastegate may be decreased) in response to increased boost demand, such as during an operator pedal tip-in. By closing the wastegate, exhaust pressures upstream of the turbine can be increased, raising turbine speed and peak power output. This allows boost pressure to be raised. Additionally, the wastegate can be moved toward the closed position to maintain desired boost pressure when the compressor recirculation valve is partially open. In another example, wastegate 72 may be opened (or an opening of the wastegate may be increased) in response to decreased boost demand, such as during an operator pedal tip-out. By opening the wastegate, exhaust pressures can be reduced, reducing turbine speed and turbine power. This allows boost pressure to be lowered.

However, in alternate embodiments, the compressor 162 may be a supercharger, where power to the compressor 162 is drawn from the crankshaft 40. Thus, the compressor 162 may be coupled to the crankshaft 40 via a mechanical linkage such as a belt. As such, a portion of the rotational energy output by the crankshaft 40, may be transferred to the compressor 162 for powering the compressor 162.

Compressor recirculation valve 158 (CRV) may be provided in a compressor recirculation path 159 around compressor 162 so that air may move from the compressor outlet to the compressor inlet so as to reduce a pressure that may develop across compressor 162. A charge air cooler 157 may be positioned in boost chamber 146, downstream of compressor 162, for cooling the boosted aircharge delivered to the engine intake. However, in other examples as shown in FIG. 1, the charge air cooler 157 may be positioned downstream of the electronic throttle 62 in an intake manifold 144. In some examples, the charge air cooler 157 may be an air to air charge air cooler. However, in other examples, the charge air cooler 157 may be a liquid to air cooler.

In the depicted example, compressor recirculation path 159 is configured to recirculate cooled compressed air from downstream of charge air cooler 157 to the compressor inlet. In alternate examples, compressor recirculation path 159 may be configured to recirculate compressed air from downstream of the compressor and upstream of charge air cooler 157 to the compressor inlet. CRV 158 may be opened and closed via an electric signal from controller 12. CRV 158 may be configured as a three-state valve having a default semi-open position from which it can be moved to a fully-open position or a fully-closed position.

Universal Exhaust Gas Oxygen (UEGO) sensor 126 is shown coupled to exhaust manifold 148 upstream of emission control device 70. Emission control device may be a catalytic converter and as such may also be referred to herein as catalytic converter 70. Alternatively, a two-state exhaust gas oxygen sensor may be substituted for UEGO sensor 126. Converter 70 may include multiple catalyst bricks, in one example. In another example, multiple emission control devices, each with multiple bricks, can be used. Converter 70 can be a three-way type catalyst in one example. While the depicted example shows UEGO sensor 126 upstream of turbine 164, it will be appreciated that in alternate embodiments, UEGO sensor may be positioned in the exhaust manifold downstream of turbine 164 and upstream of convertor 70. Additionally or alternatively, the converter 70 may comprise a diesel oxidation catalyst (DOC) and/or a diesel cold-start catalyst.

In some examples, a particulate filter (PF) 74 may be coupled downstream of the emission control device 70 to trap soot in a direction of exhaust gas flow. In some examples, there may exist a selective catalytic reduction device and/or a lean $NO_x$ trap between the converter 70 and the PF 74. The PF 74 may be manufactured from a variety of materials including cordierite, silicon carbide, and other high temperature oxide ceramics. The PF 74 may be periodically regenerated in order to reduce soot deposits in the filter that resist exhaust gas flow. Filter regeneration may be accomplished by heating the filter to a temperature that will burn soot particles at a faster rate than the deposition of new soot particles, for example, 400-600° C.

However, in other examples, due to the inclusion of flow-through passage(s) in a nozzle of the fuel injector 66, PF 74 may not be included in the engine 10. As such soot production during the combustion cycle may be reduced. In some examples, soot levels may be reduced to approximately zero due to the increased commingling of fuel and air prior to combustion/ignition of the mixture in the combustion chamber 30. As such, approximately no soot (e.g., zero soot) may be produced by engine 10 during the combustion cycle in some examples. In other examples, due to the features of the injector, soot production may be reduced and as such, the PF 74 may be regenerated less frequently, reducing fuel consumption.

During the combustion cycle, each cylinder within engine 10 may undergo a four stroke cycle including: an intake stroke, compression stroke, power stroke, and exhaust stroke. During the intake stroke and power stroke, the piston 36 moves away from the cylinder head 16 towards a bottom of the cylinder increasing the volume between the top of the piston 36 and the fire deck 19. The position at which piston 36 is near the bottom of the cylinder and at the end of its intake and/or power strokes (e.g., when combustion chamber 30 is at its largest volume) is typically referred to by those of skill in the art as bottom dead center (BDC). Conversely, during the compression and exhaust strokes, the piston 36 moves away from BDC towards a top of the cylinder (e.g., fire deck 19), thus decreasing the volume between the top of the piston 36 and the fire deck 19. The position at which piston 36 is near the top of the cylinder and at the end of its compression and/or exhaust strokes (e.g., when combustion chamber 30 is at its smallest volume) is typically referred to by those of skill in the art as top dead center (TDC). Thus, during the intake and power strokes, the piston 36 moves from TDC to BDC, and during the compression and exhaust strokes, the piston 36 moves from BDC to TDC.

Further, during the intake stroke, generally, the exhaust valves 154 close and the intake valves 152 open to admit intake air into the combustion chamber 30. During the compression stroke, both valves 152 and 154 may remain closed, as the piston 36 compresses the gas mixture admitted during the intake stroke. During the compression stroke, gases in the combustion chamber 30 may be pushed into the fuel injector 66 due to the positive pressure created by the piston 36 as it travels towards the injector 66. The gases from the combustion chamber 30 may dissipate heat through one or more of the cylinder head 16 and ambient air via conduction and/or convection. As such, the temperature of the gases in the injector 66 may be reduced relative to the temperature of the gases in the combustion chamber 30.

When the piston 36 is near or at TDC during the compression and/or power stroke, fuel is injected into the combustion chamber 30 by injector 66. During the ensuing power stroke, the valves 152 and 154 remain closed, as the expanding and combusting fuel and air mixture pushes the piston 36 towards BDC. In some examples, fuel may be injected prior to the piston 36 reaching TDC, during the compression stroke. However, in other examples, fuel may be injected when the piston 36 reaches TDC. In yet further examples, fuel may injected after the piston 36 reaches TDC and begins to translate back towards BDC during the power stroke. In yet further examples, fuel may be injected during both the compression and power strokes.

Fuel may be injected over a duration. An amount of fuel injected and/or the duration over which fuel is injected may be varied via pulse width modulation (PWM) according to one or more linear or non-linear equations. Further, the injector 66 may include a plurality of injection orifices, and an amount of fuel injected out of each orifice may be varied as desired.

The injected fuel travels through a volume of the nozzle of the injector 66 before entering the combustion chamber 30. Said another way, the nozzle may include air passages and fuel passages for entraining air and fuel, wherein the passages are located inside the combustion chamber 30. However, the passages are defined by surfaces of the nozzle and fuel injector body and fuel and air flow through these passages before flowing outside of the nozzle and into the combustion chamber 30 to mix with unmixed combustion chamber gases. The flow of air and fuel through the nozzle will be described in greater detail below.

During the exhaust stroke, the exhaust valves 154 may open to release the combusted air-fuel mixture to exhaust manifold 148 and the piston 36 returns to TDC. Exhaust gases may continue to flow from the exhaust manifold 148, to the turbine 164 via exhaust passage 180.

Both the exhaust valves 154 and the intake valves 152 may be adjusted between respective closed first positions and open second positions. Further, the position of the valves 154 and 152 may be adjusted to any position between their respective first and second positions. In the closed first position of the intake valves 152, air and/or an air/fuel mixture does not flow between the intake manifold 144 and the combustion chamber 30. In the open second position of the intake valves 152, air and/or an air/fuel mixture flows between the intake manifold 144 and the combustion chamber 30. In the closed second position of the exhaust valves 154, air and/or an air fuel mixture does not flow between the combustion chamber 30 and the exhaust manifold 148. However, when the exhaust valves 154 is in the open second position, air and/or an air fuel mixture may flow between the combustion chamber 30 and the exhaust manifold 148.

Note that the above valve opening and closing schedule is described merely as an example, and that intake and exhaust valve opening and/or closing timings may vary, such as to provide positive or negative valve overlap, late intake valve closing, or various other examples.

Controller 12 is shown in FIG. 1 as a microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an input device 130 for sensing input device pedal position (PP) adjusted by a vehicle operator 132; a knock sensor for determining ignition of end gases (not shown); a measurement of engine manifold pressure (MAP) from pressure sensor 121 coupled to intake manifold 144; a measurement of boost pressure from pressure sensor 122 coupled to boost chamber 146; an engine position sensor from a Hall effect sensor 118 sensing crankshaft 40 position; a measurement of air mass entering the engine from sensor 120 (e.g., a hot wire air flow meter); and a measurement of throttle position from sensor 58. Barometric pressure may also be sensed (sensor not shown) for processing by controller 12. In a preferred aspect of the present description, Hall effect sensor 118 produces a predetermined number of equally spaced pulses every revolution of the crankshaft from which engine speed (RPM) can be determined. The input device 130 may comprise an accelerator pedal and/or a brake pedal. As such, output from the position sensor 134 may be used to determine the position of the accelerator pedal and/or brake pedal of the input device 130, and therefore determine a desired engine torque. Thus, a desired engine torque as requested by the vehicle operator 132 may be estimated based on the pedal position of the input device 130.

In some examples, vehicle 5 may be a hybrid vehicle with multiple sources of torque available to one or more vehicle wheels 59. In other examples, vehicle 5 is a conventional vehicle with only an engine, or an electric vehicle with only electric machine(s). In the example shown, vehicle 5 includes engine 10 and an electric machine 61. Electric machine 61 may be a motor or a motor/generator. Crankshaft 40 of engine 10 and electric machine 61 are connected via a transmission 54 to vehicle wheels 59 when one or more clutches 56 are engaged. In the depicted example, a first clutch 56 is provided between crankshaft 40 and electric machine 61, and a second clutch 56 is provided between electric machine 61 and transmission 54. Controller 12 may send a signal to an actuator of each clutch 56 to engage or disengage the clutch, so as to connect or disconnect crankshaft 40 from electric machine 61 and the components connected thereto, and/or connect or disconnect electric machine 61 from transmission 54 and the components connected thereto. Transmission 54 may be a gearbox, a planetary gear system, or another type of transmission. The powertrain may be configured in various manners including as a parallel, a series, or a series-parallel hybrid vehicle.

Electric machine 61 receives electrical power from a traction battery 58 to provide torque to vehicle wheels 59. Electric machine 61 may also be operated as a generator to provide electrical power to charge battery 58, for example during a braking operation.

The controller 12 receives signals from the various sensors of FIG. 1 and employs the various actuators of FIG. 1 to adjust engine operation based on the received signals and instructions stored on a memory of the controller. For example, adjusting a fuel injection may include adjusting an actuator of the injector 66 to move to or away from a nozzle of the injector 66 so that fuel may flow to the combustion chamber 30.

Turning now to FIG. 2A, it shows an embodiment 200 of the fuel injector 66. Thus, components previously introduced may be similarly numbered in subsequent figures. The embodiment 200 may illustrate a cross-section of the fuel injector 66. The fuel injector 66 may comprise a nozzle 210 configured to actuate to adjust one or more injection settings as will be described herein.

An axis system 290 is shown comprising two axes, namely, an x-axis parallel to a horizontal direction and a y-axis parallel to a vertical direction. Thus, the cross-section of the fuel injector 66 may be within an x-y plane. In one example, the x-y plane may be the only cutting plane of the fuel injector 66 about which the fuel injector 66 is symmetric. That is to say, the fuel injector 66 is symmetric about only a single plane, in one example. In the embodiment 200, the injector 66 is illustrated as a side-mount injector and may inject in a direction perpendicular to a first central axis 298 of the combustion chamber 30. In some examples, a piston (e.g., piston 36 of FIG. 1) may oscillate parallel to the central axis 298. The fuel injector 66 may comprise a second central axis 299, perpendicular to the first central axis 298, along which a nozzle 210 of the fuel injector 66 may be actuated. Thus, a fuel may be injected substantially angled to the first central axis 298.

The cross-section of the nozzle 210 may comprise half-broom shape. Additionally or alternatively, the cross-section of the nozzle 210 may comprise an L-shape, t-shape, hockey stick shape, and the like. Thus, a portion of the nozzle 210 may extend in a direction parallel to the second central axis 299 before extending in a direction angled to the second central axis 299.

The nozzle 210 may comprise a stem 212 extending along the second central axis 299. The stem 212 may be contiguous with an end portion 214 of the nozzle. The stem 212 may comprise a half-cylinder shape and be arranged substantially parallel to the second central axis 299. The end portion 214 may extend from a first extreme end of the stem 212. The end portion 214 may comprise a half-cone shape, such that an apex of the end portion 214 is coupled to the stem 212 and a base of the end portion 214 faces the combustion chamber 30. In one example, the base of the end-portion 214 is a half-circle shape, or D-shape, of fixed radius relative to the second central axis 299. Additionally or alternatively, the base of the end-portion may be C-shaped as will be described below. In one example, the stem 212 comprises only a half-cylinder shape and the end-portion 214 comprises only a half-cone shape. The half-cylinder shape extending from only an apex of the half-cone shape.

The stem 212 may be coupled to an actuator 202. More specifically, the stem 212 may be physically coupled to a platform 216 at its second extreme end, wherein the platform 216 is in direct contact to the actuator 202 on a first side and springs 204 on a second side. The platform 216 may comprise a rectangular prism shape having a rectangular cross-section. The actuator 202 may receive signals from the controller 12 instructing the actuator 202 to apply a force to the platform 216 to overcome a force of the springs 204. By doing this, the nozzle 210 may be actuated outside of a first position. The position of the injector 66 illustrated in the embodiment 200 of FIG. 2A may be identical to the first position, wherein a fuel injection may not occur. In the absence of the force, the springs 204 may press against the platform 216, actuating the nozzle 210 away from the combustion chamber 30, and force the nozzle 210 into the first position, where the end portion 214 may be pressed against outlet surface 222 of the injector body 206.

In the first position, the fuel injector 66 may be configured to prevent fuel from injecting into the combustion chamber 30. Thus, the end portion 214 may form a hermetic seal with the outlet surface 222 to prevent and/or decrease fuel flowing from a sac 207 into the combustion chamber 30. The sac 207 may comprise a half-donut shape. The sac 207 may receive fuel from a fuel feed line 226. In some examples, the fuel feed line 226 may fluidly couple a fuel rail to the sac 207.

In this way, the nozzle 210 is positioned to actuate within a fuel injector body 206, wherein actuation of the nozzle 210 may adjust a volume of the sac 207 and one or more fuel injection conditions. The one or more fuel injection conditions may include a fuel injection volume, fuel injection pressure, and fuel injection angle. In the first position, the end portion 214 of the nozzle 210 may press against the outlet surface 222 of the fuel injector body 206 to hermetically seal an outlet passage (e.g., outlet passage 224 of FIG. 2B).

Turning now to FIG. 2B, it shows an embodiment 250 of the fuel injector 66 being arranged in a second position. The second position may correspond to a position of the fuel injector 66 where fuel may be injected into the combustion chamber 30. More specifically, the second position may correspond to a fully open position of the fuel injector 66. In some examples, the first position illustrated in the embodiment of FIG. 2A may correspond to a fully closed position of the fuel injector 66. In this way, the first and second positions may depict extreme positions of the fuel injector 66. It will be appreciated that the fuel injector 66 may include a plurality of positions between the first and second positions. The plurality of positions may be referred to herein as more open or more closed positions, wherein a more open position may refer to a position of the fuel injector 66 more closely resembling the second position (e.g., greater than 50% open). Thus, a more closed position may refer to a position of the fuel injector 66 more closely resembling the first position (e.g., less than 50% open). A more open position may inject more fuel to the combustion chamber 30 than a more closed position.

Each of the plurality of positions may correspond to one or more of a fuel injection volume, fuel injection pressure, and fuel injection angle. For example, if the fuel injector 66 is in a more closed position, then a fuel injection may comprise a smaller fuel injection angle. The fuel injection angle may be measured relative to the second central axis 299. As such, a smaller fuel injection angle may refer to a fuel injection which deviates less from the second central axis 299. An angular range in which the fuel injector 66 may inject fuel may be between 5 to 80 degrees. Thus, the fuel injection from the fuel injector 66 may not cross and/or traverse the second central axis 299. As such, the fuel injection may not be directed toward the piston and may only be directed toward an upper region of the combustion chamber 30 adjacent a spark plug. In some examples, as the nozzle 210 is moved from the first position to the second position, the fuel injection angle may increase and be directed more toward the fire deck or spark plug (e.g., fire deck 19 or spark plug 92 of FIG. 1).

In the second position, the actuator 202 presses against the platform 216 to overcome a force of the springs 204, thereby actuating the nozzle 210 toward the combustion chamber 30. An outlet passage 224 may form between the outlet surface 222 and the nozzle 210. Fuel from the sac 207 may flow to the combustion chamber 30 via the outlet passage 224, as shown via black head arrows depicting an example of fuel flow. The outlet passage 224 may comprise a half-annular venturi shape such that the outlet passage 224 comprises a restriction between its inlet and outlet. Said another way, the outlet passage 224 may comprise a venturi inlet and a venturi outlet, with a venturi throat arranged therebetween. In one example, the outlet passage 224 comprises only a half-annular venturi shape, formed between the end-portion 214 and outlet surface 222. The outlet surface 222 protruding toward the end-portion 214.

In some examples, the fuel injector 66 may be a side-wall mount injector, and not mounted to or through the cylinder head, as described above in FIG. 1. The fuel injector 66 may be arranged such that the fuel injection may be directed toward a spark plug and/or fire deck of the combustion chamber 30 and away from a top-surface of the piston. This may prevent and/or mitigate fuel impingement on the piston, thereby decreasing soot emitted from the combustion chamber 30.

Turning now to FIG. 3A, it shows a first embodiment 300 of the nozzle 210 comprising air entrainment features 310. In the first embodiment, the nozzle 210 may be partially hollow such that air entrainment features 310 may direct combustion chamber gases from the combustion chamber 30 to the outlet passage 224 when the fuel injector 66 is outside of the first position. More specifically, the end portion 214 may be completely solid except for the air entrainment features 310 which may be arranged through the end portion 214, extending from its base to an angular surface, to promote combustion chamber gases mixing with a fuel injection prior to the injection reaching the combustion chamber 30. As described above, the outlet passage 224 may comprise a half-annular venturi shape. A venturi throat and/or restricted portion of the outlet passage 224 may promote combustion chamber gas flow through the air entrainment features 310, as shown by white head arrows. As depicted, the combustion chamber gases enter the air entrainment features 310 through the end portion 214 and flow in a direction angled to the second central axis 299 before entering the outlet passage 224, where the combustion chamber gases may mix with fuel. By flowing combustion chamber gases in this way, a swirl and/or other form of turbulence in the outlet passage may increase, thereby increasing mixing between fuel and combustion chamber gases.

The air entrainment feature 310 may comprise a plurality of passages 312. The passages 312 may extend from a base of the end portion 214 to an angled side wall adjacent the venturi throat of the outlet passage 224. The passages 312 may comprise a cylindrical shape. Additionally or alternatively, the passages may be rectangular prisms, conical, or other similar shapes. In the example of FIG. 3A, there are exactly three passages. However, in other examples, there may be two passages or four or more passages.

Turning now to FIG. 3B, it shows a second embodiment 350 of the nozzle 210, which is substantially similar to the first embodiment 300, except that the air entrainment features 360 are different than the air entrainment features 310. The air entrainment features 360 may comprise a half-bell shape chamber 362 with a cylindrical passage 364 extending therefrom. The cylinder may serve as the outlet for which combustion chamber gases may flow through and to the outlet passage 224.

The fuel injector 66 may be fitted with the air entrainment features 310 or 360 based on one or more of a compression ratio of the cylinder, fuel type, average fuel injection pressure, and ambient environment. The air entrainment features 310 and 360 may provide some air/fuel mixing prior to injecting fuel into the combustion chamber 30, while decreasing a fuel injection temperature. The venturi throat of the outlet passage 224 may promote combustion chamber gas flow through the air entrainment features 310 and 360 via a low pressure forming therein. Additionally or alternatively, the combustion chamber gases flowing out of air entrainment features 310 and 360 to the outlet passage 224 may induce a swirl to the fuel injection, which may promote further mixing upon reaching the combustion chamber 30.

In this way, a fuel injector may comprise a half-annular venturi shaped outlet passage configured to inject fuel away from a piston. An opening of the outlet passage may be adjusted based on an interaction between a half-cone shaped end portion of a nozzle and an outlet surface of the fuel injector. The technical effect of injecting fuel through the half-annular venturi shaped outlet passage is to direct the fuel away from the piston while further promoting combustion chamber gas flow through one or more air entraining features of the nozzle. By doing this, soot emissions from the combustion chamber may be decreased, thereby increasing a fuel economy.

One example of a fuel injector as described herein may include a nozzle comprising a half-cylindrical stem and a half-conical end portion, and where an outlet passage comprises a half-annular venturi shape configured to flow fuel when the nozzle is actuated toward a combustion chamber. A first example of the fuel injector further includes where nozzle is a single contiguous piece. A second example of the fuel injector, optionally including the first example, further includes where the stem is physically coupled to the end portion at a first extreme end, and where the stem is physically coupled to a platform at a second extreme end, wherein the platform is a rectangular prism and physically coupled to each of an actuator and a plurality of springs. A third example of the fuel injector, optionally including the first and/or second examples, further includes where the end portion hermitically seals the outlet passage by pressing against an outlet surface of the fuel injector in a first position, and where the end position is spaced away from the outlet surface to fluidly couple a sac to the combustion chamber when in a second position. A fourth example of the fuel injector, optionally including one or more of the first through third examples, further includes where the end portion is at least partially hollow and comprises one or more air entraining features configured to flow combustion chamber gases to the outlet passage. A fifth example of the fuel injector, optionally including one or more of the first through fourth examples, further includes where the air entraining features comprise a plurality of cylindrical passages extending from a base of the end portion to a venturi throat of the outlet passage. A sixth example of the fuel injector, optionally including one or more of the first through fifth examples, further includes where the air entraining features comprise a single cylindrical passage extending from a base of the end portion to a venturi throat of the outlet passage.

An example system may comprise an engine comprising a combustion chamber, and a fuel injector mounted on a side wall of the combustion chamber positioned to inject in a direction angled to an axis of oscillation of a piston, wherein the fuel injector comprises a nozzle comprising a half-cylinder shaped stem, a half-cone shaped end portion, and an outlet passage comprising a half-annular venturi shape, the outlet passage arranged between an outlet surface of the fuel injector and the end portion. A first example of the system, optionally includes where the outlet passage is adjustable based on an actuation of the nozzle via an actuator or a plurality of springs. A second example of the system, optionally including the first example, further includes where the actuator overcomes a force of the springs and presses the nozzle toward the combustion chamber to increase an opening of the outlet passage. A third example of the system, optionally including the first and/or second examples, further includes where the plurality of springs press the nozzle away from the combustion chamber and decrease an opening of the outlet passage. A fourth example of the system, optionally including one or more of the first through third examples, further includes where the end portion is partially hollow and comprises one or more passages extending from a base of the end portion to an angled surface of the end portion, wherein the one or more passages are configured to direct combustion chamber gases from the combustion chamber to the outlet passage. A fifth example of the system, optionally including one or more of the first through fourth examples, further includes where the fuel injector is positioned to inject in a direction toward a top surface of the combustion chamber, away from the piston. A sixth example of the system, optionally including one or more of the first through fifth examples, further includes where a sac for storing fuel in the fuel injector, wherein the sac comprises a half-donut shape. A seventh example of the system, optionally including one or more of the first through sixth examples, further includes where the fuel injector injects toward a spark plug.

An example system may comprise an engine comprising at least one cylinder, the at least one cylinder comprising a combustion chamber having a volume defined by a side wall, a top surface, and a piston, and a spark plug mounted on the top surface and a fuel injector mounted on the side wall, the fuel injector positioned to inject only toward the spark plug away from the piston, where an outlet passage comprises a half-annular venturi shape and extends between an outlet surface of the fuel injector and a half-cone portion of a nozzle of the fuel injector. A first example of the system, further includes where the outlet passage comprises a venturi inlet, a venturi throat, and a venturi outlet, and where the venturi throat is between the venturi inlet and venturi outlet, and where the venturi throat is fluidly coupled to an air entraining feature of the half-cone portion. A second example of the system, optionally including the first example, further includes where the air entraining feature comprises a bell-shaped chamber and a cylinder shaped passage, the bell-shaped chamber receiving combustion chamber gases from the combustion chamber and the cylinder shaped passage flowing combustion chamber gases to the venturi throat. A third example of the system, optionally including the first and/or second examples, further includes where the half-cone portion is physically coupled to a half-cylinder portion extending through a half-toroid shaped sac. A fourth example of the system, optionally including one or more of the first through third examples, further includes where wherein the fuel injector comprises a single axis of symmetry.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A fuel injector, comprising:
a nozzle comprising a half-cylindrical stem and a half-conical end portion, and where an outlet passage comprises a half-annular venturi shape shaped to flow fuel when the nozzle is actuated toward a combustion chamber,
wherein the end portion is at least partially hollow, the end portion comprising one or more air entraining features configured to flow combustion chamber gases to the outlet passage.

2. The fuel injector of claim 1, wherein the nozzle is a single continuous piece.

3. The fuel injector of claim 1, wherein the stem is physically coupled to the end portion at a first extreme end of the stem, and where the stem is physically coupled to a platform at a second extreme end of the stem, wherein the platform is a rectangular prism and physically coupled to each of an actuator and a plurality of springs.

4. The fuel injector of claim 1, wherein the end portion hermitically seals the outlet passage by pressing against an outlet surface of the fuel injector in a first position, and where the end portion is spaced away from the outlet surface to fluidly couple a sac to the combustion chamber when in a second position.

5. The fuel injector of claim 1, wherein the one or more air entraining features comprise a plurality of cylindrical passages extending from a base of the end portion to a venturi throat of the outlet passage.

6. The fuel injector of claim 1, wherein the one or more air entraining features comprise a single cylindrical passage extending from a base of the end portion to a venturi throat of the outlet passage.

7. A system comprising:
an engine comprising a combustion chamber; and
a fuel injector mounted on a side wall of the combustion chamber positioned to inject in a direction angled to an axis of oscillation of a piston, wherein
the fuel injector comprises a nozzle comprising a stem and a half-cone shaped end portion, where the stem comprises only a half-cylinder shape, where the end portion comprises one or more passages extending from a base of the end portion to an angled surface of the end portion, and where an outlet passage comprising a half-annular venturi shape is arranged between an outlet surface of the fuel injector and the end portion.

8. The system of claim 7, wherein the outlet passage is adjustable based on an actuation of the nozzle via an actuator or a plurality of springs.

9. The system of claim 8, wherein the actuator overcomes a force of the plurality of springs and presses the nozzle toward the combustion chamber to increase an opening of the outlet passage.

10. The system of claim 8, wherein the plurality of springs press the nozzle away from the combustion chamber and decrease an opening of the outlet passage.

11. The system of claim 7, wherein the end portion is partially hollow, and wherein the one or more passages are configured to direct combustion chamber gases from the combustion chamber to the outlet passage.

12. The system of claim 7, wherein the fuel injector is positioned to inject in a direction toward a top surface of the combustion chamber, away from the piston.

13. The system of claim 7, further comprising a sac for storing fuel in the fuel injector, wherein the sac comprises a half-donut shape.

14. The system of claim 7, wherein the fuel injector injects toward a spark plug.

15. A system, comprising:
an engine comprising at least one cylinder, the at least one cylinder comprising a combustion chamber having a volume defined by a side wall, a top surface, and a piston; and
a spark plug mounted on the top surface and a fuel injector mounted on the side wall, the fuel injector positioned to inject only toward the spark plug away from the piston, where
an outlet passage comprises a half-annular venturi shape including a venturi inlet, a venturi throat, and a venturi outlet, where the venturi throat is between the venturi inlet and the venturi outlet, and where the venturi throat is fluidly coupled to an air entraining feature of a half-cone portion of a nozzle of the fuel injector, the air entraining feature comprising a bell-shaped chamber and a cylinder-shaped passage, and where the outlet passage extends between an outlet surface of the fuel injector and the half-cone portion of the nozzle of the fuel injector.

16. The system of claim 15, wherein the bell-shaped chamber receives combustion chamber gases from the combustion chamber and the cylinder-shaped passage flows the combustion chamber gases to the venturi throat.

17. The system of claim 15, wherein the half-cone portion is physically coupled to a half-cylinder portion extending through a half-toroid shaped sac.

18. The system of claim 15, wherein the fuel injector comprises a single plane of symmetry.

19. The system of claim 15, wherein the air entraining feature is configured to mix air with fuel prior to combustion.

20. The system of claim 17, wherein the half-cylinder portion comprises only a half-cylinder shape.

\* \* \* \* \*